United States Patent
Ali-Santosa

(10) Patent No.: US 6,636,231 B1
(45) Date of Patent: *Oct. 21, 2003

(54) APPARATUS FOR APPROXIMATION OF CAPS OF SMOOTH LINE SEGMENTS

(75) Inventor: Gunawan Ali-Santosa, Milpitas, CA (US)

(73) Assignee: Sun Microsystems, Inc., Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/544,868

(22) Filed: Apr. 7, 2000

(51) Int. Cl.[7] .................................................. G09G 5/00
(52) U.S. Cl. ...................... 345/611; 345/443; 345/589; 382/269
(58) Field of Search ................................ 345/611, 443, 345/534, 573, 589; 382/269

(56) References Cited

U.S. PATENT DOCUMENTS 4,352,100 A * 9/1982 O'Connell .................. 345/534
6,329,977 B1 * 12/2001 McNamara et al. ........ 345/443

OTHER PUBLICATIONS

Mohammed, Osama and Garcia, Luis, IEEE: An Optimum Finite Element Grid Generator for Triangulating Rotating and Fixed Objects in Electromagnetics (1989), Session 11D2, pp. 804–808.*

* cited by examiner

Primary Examiner—Joseph Mancuso
Assistant Examiner—Scott L. Luedke
(74) Attorney, Agent, or Firm—Thelen Reid & Priest LLP; Marc S. Hanish

(57) ABSTRACT

Starting and ending caps of smooth line segments may be drawn on a computer display without complicated calculations and avoiding the use of inverse square root calculations by drawing the caps using rectangles. The direction of the line segment may be determined, and using the direction certain pixels in a four-pixel grouping may be selectively illuminated. The normalized intensity values of the illuminated pixels may be determined by computing an x-fraction and a y-fraction, representing the distance in the x-direction and y-direction between a sample origin point in a corner of the four-pixel grouping and the closest corner of a region covered by the mathematical origin or endpoint corrected for the thickness of the line segment. It is generally preferable for only two pixels to be illuminated for each cap, the pixels chosen according to a formula ensuring that there are no perception problems when two smooth line segments share a common mathematical origin or endpoint.

20 Claims, 16 Drawing Sheets

|   | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0 | 100 | 0F0 | 0E0 | 0D0 | 0C0 | 0B0 | 0A0 | 090 | 080 | 070 | 060 | 050 | 040 | 030 | 020 | 010 |
| 1 | 0F0 | 0E1 | 0D2 | 0C3 | 0B4 | 0A5 | 096 | 087 | 078 | 069 | 05A | 04B | 03C | 02D | 01E | 00F |
| 2 | 0E0 | 0D2 | 0C4 | 0B6 | 0A8 | 09A | 08C | 07E | 070 | 062 | 054 | 046 | 038 | 02A | 01C | 00E |
| 3 | 0D0 | 0C3 | 0B6 | 0A9 | 09C | 08F | 082 | 075 | 068 | 05B | 04E | 041 | 034 | 027 | 01A | 00D |
| 4 | 0C0 | 0B4 | 0A8 | 09C | 090 | 084 | 078 | 06C | 060 | 054 | 048 | 03C | 030 | 024 | 018 | 00C |
| 5 | 0B0 | 0A5 | 09A | 08F | 084 | 079 | 06E | 063 | 058 | 04D | 042 | 037 | 02C | 021 | 016 | 00B |
| 6 | 0A0 | 096 | 08C | 082 | 078 | 06E | 064 | 05A | 050 | 046 | 03C | 032 | 028 | 01E | 014 | 00A |
| 7 | 090 | 087 | 07E | 075 | 06C | 063 | 05A | 051 | 048 | 03F | 036 | 02D | 024 | 01B | 012 | 009 |
| 8 | 080 | 078 | 070 | 068 | 060 | 058 | 050 | 048 | 040 | 038 | 030 | 028 | 020 | 018 | 010 | 008 |
| 9 | 070 | 069 | 062 | 05B | 054 | 04D | 046 | 03F | 038 | 031 | 02A | 023 | 01C | 015 | 00E | 007 |
| A | 060 | 05A | 054 | 04E | 048 | 042 | 03C | 036 | 030 | 02A | 024 | 01E | 018 | 012 | 00C | 006 |
| B | 050 | 04B | 046 | 041 | 03C | 037 | 032 | 02D | 028 | 023 | 01E | 019 | 014 | 00F | 00A | 005 |
| C | 040 | 03C | 038 | 034 | 030 | 02C | 028 | 024 | 020 | 01C | 018 | 014 | 010 | 00C | 008 | 004 |
| D | 030 | 02D | 02A | 027 | 024 | 021 | 01E | 01B | 018 | 015 | 012 | 00F | 00C | 009 | 006 | 003 |
| E | 020 | 01E | 01C | 01A | 018 | 016 | 014 | 012 | 010 | 00E | 00C | 00A | 008 | 006 | 004 | 002 |
| F | 010 | 00F | 00E | 00D | 00C | 00B | 00A | 009 | 008 | 007 | 006 | 005 | 004 | 003 | 002 | 001 |

*FIG. 12*

APPARATUS FOR APPROXIMATION OF CAPS OF SMOOTH LINE SEGMENTS

CROSS-REFERENCE TO RELATED APPLICATIONS

The present application is a continuation of co-pending U.S. patent application Ser. No. 09/544,658 entitled "METHOD FOR APPROXIMATION OF CAPS OF SMOOTH LINE SEGMENTS", filed on Apr. 6, 2000, in the name of the same inventor and commonly assigned herewith.

BACKGROUND OF THE INVENTION

1. Field of the Invention

The present invention relates to computer displays. More specifically, the present invention relates to a method for the approximation of caps of smooth line segments on computer displays.

2. The Background

A computer display is made up of rows and columns of pixels. Each pixel may be very small. However, computer display technology has not yet advanced to the point where the pixels are small enough to avoid several limitations encountered when graphics are viewed by the human eye.

Sampling of images to be displayed on a computer, or of equations representing lines, results in a somewhat jagged appearance, also called the "staircase" effect. This is due to the fact that the sampling process digitizes coordinate points on an object or line to discrete integer pixel positions, resulting in an image having staggered edges. This distortion is also called "aliasing". FIG. 1 is a diagram illustrating the staircase effect. Line 10 is sampled and then displayed using a group of shaded pixels 12. One can see by viewing the shaded pixels 12 that they appear jagged and suffer from the staircase effect.

Techniques used to decrease the aliasing suffered in computer graphics are known collectively as antialiasing techniques. The most obvious antialiasing technique is to simply increase the resolution of the display, so that each pixel is smaller. However, as discussed earlier, computer monitor technology as of yet does not provide for a display with such small pixels that aliasing is not viewable to the human eye.

A common antialiasing method is to increase the sampling rate by treating the display as if it were covered by a finer grid than it really is. This is known as supersampling. Supersampling works best on displays which are capable of displaying pixels at different intensities.

Typical supersampling techniques attempt to smooth the staircase effect by using the surrounding pixels. FIG. 2 is a diagram illustrating a supersampling technique applied to the aliased line of FIG. 1. The group of shaded pixels 50 is now much wider than in FIG. 1, and there is less of a staircase effect simply because they are wider. However, this technique also utilizes the ability to vary intensity of each pixel to smooth the edges of the line. For example, without the ability to vary intensities, pixel 52 would have to be completely shaded. However, by varying the intensity of pixel 52, it gives the viewer the impression that only a region of pixel 52 is filled, and thus makes the line appear much smoother.

One drawback to supersampling is that identifying subpixels to be selectively turned on and off requires a larger number of calculations than simply determining which pixels are along a line path. These calculations are further complicated by the fact that the position of the line path within each pixel varies depending on the slope of the line. In a 45-degree line, the line path cuts each pixel in half diagonally, but a 30-degree line path does not.

Endpoints of a line, which are referred to in this application as caps, require very complex calculations, such as inverse squares. FIG. 3 is a diagram illustrating a single pixel containing an end-point of a line. The mathematical line 100 is known, and therefore the length of segment c can be determined fairly easily. However, the area of the entire shaded region 102 must be determined in order to determine the intensity of the pixel and the orientation of the subpixels. This involves numerous computations using the Pythagorean theorem, beginning with determining a from b and c (according to the Pythagorean theorem, $a^2+b^2=c^2$, so in order to determine a, a square root, or in computer terms inverse root must be computed).

An inverse root is one of the most complicated computations a processor can make. In recent years, there has been movement away from powerful mainframe computers to smaller, cheaper, less powerful processors, such as those that may be contained in set-top boxes and hand-held devices.

While in a large computer, antialiasing techniques may be applied using hardware, such as graphics cards, the space is not available for such hardware in these smaller, less powerful processors. Additionally, the cost of implementing the techniques in hardware may be prohibitive. Therefore, it would be preferable to perform such techniques using software.

However, performing the traditional antialiasing in software would take too much processing power due to all the inverse squares that would have to be calculated, which would slow down the processor to intolerable levels. What is needed is a solution which allows for an antialiasing technique to be applied which could be performed by software but which does not use as much processing power as traditional antialiasing techniques.

SUMMARY OF THE INVENTION

Starting and ending caps of smooth line segments may be drawn on a computer display without complicated calculations and avoiding the use of inverse square root calculations by drawing the caps using rectangles. The direction of the line segment may be determined, and using the direction certain pixels in a four-pixel grouping may be selectively illuminated. The normalized intensity values of the illuminated pixels may be determined by computing an x-fraction and a y-fraction, representing the distance in the x-direction and y-direction between a sample origin point in a corner of the four-pixel grouping and the closest corner of a region covered by the mathematical origin or endpoint corrected for the thickness of the line segment. It is generally preferable for only two pixels to be illuminated for each cap, the pixels chosen according to a formula ensuring that there are no perception problems when two smooth line segments share a common mathematical origin or endpoint.

BRIEF DESCRIPTION OF THE DRAWINGS

FIG. 12 is an example of a look-up table in accordance with a presently preferred embodiment of the present invention.

DETAILED DESCRIPTION OF A PREFERRED EMBODIMENT

Those of ordinary skill in the art will realize that the following description of the present invention is illustrative only and not in any way limiting. Other embodiments of the invention will readily suggest themselves to such skilled persons after review of this disclosure.

In accordance with a presently preferred embodiment of the present invention, the components, processes and/or data structures are implemented using software. Different implementations may be used and may include other types of programming languages, computing platforms, computer programs, firmware and/or general purpose machines. In addition, those of ordinary skill in the art will readily recognize that devices of a less general purpose nature, such as hardwired devices, devices relying on FPGA (field programmable gate array) or ASIC (Application Specific Integrated Circuit) technology, or the like, may also be used without departing from the scope and spirit of the inventive concepts disclosed herein.

Figure 1:
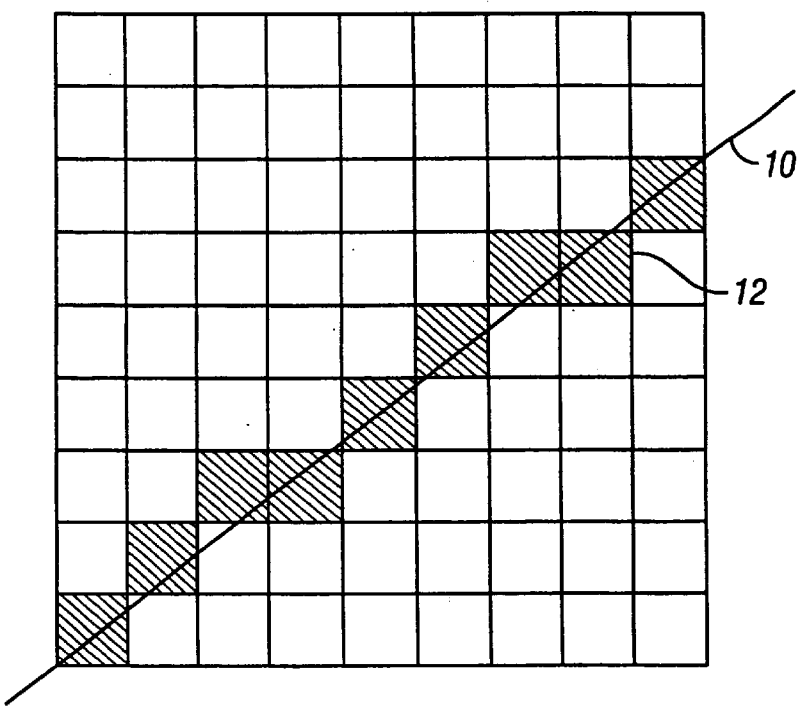
FIG. 1 is a diagram illustrating the staircase effect of a group of pixels on a computer display.
Figure 2:
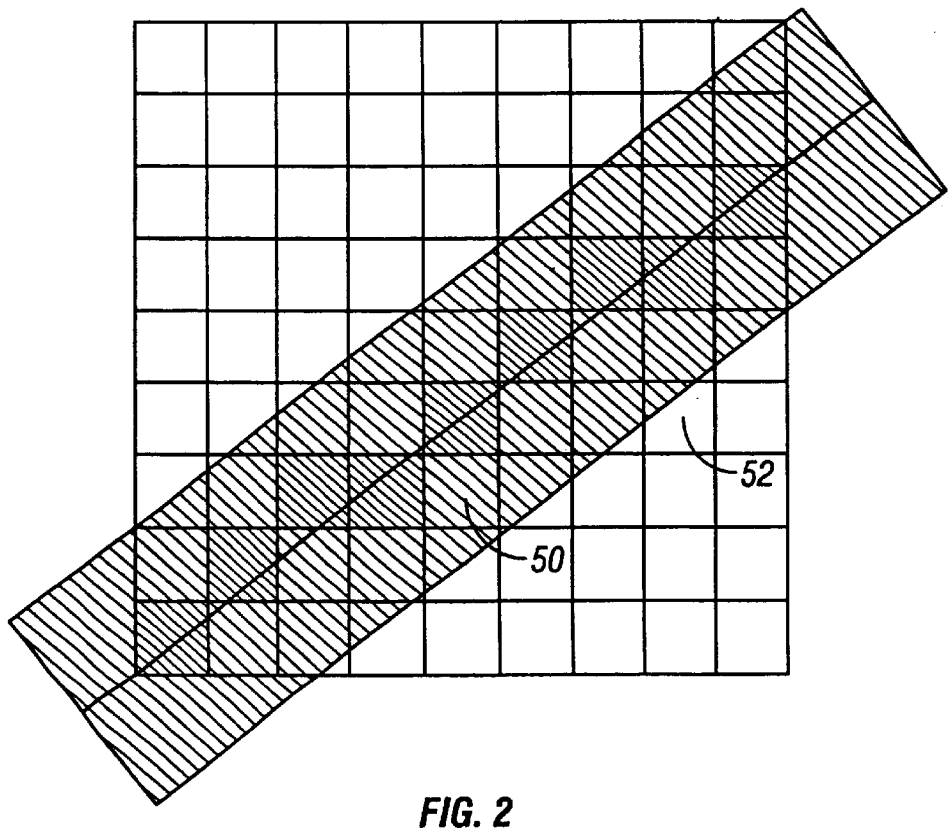
FIG. 2 is a diagram illustrating a supersampling technique applied to the aliased line of FIG. 1.
Figure 3:
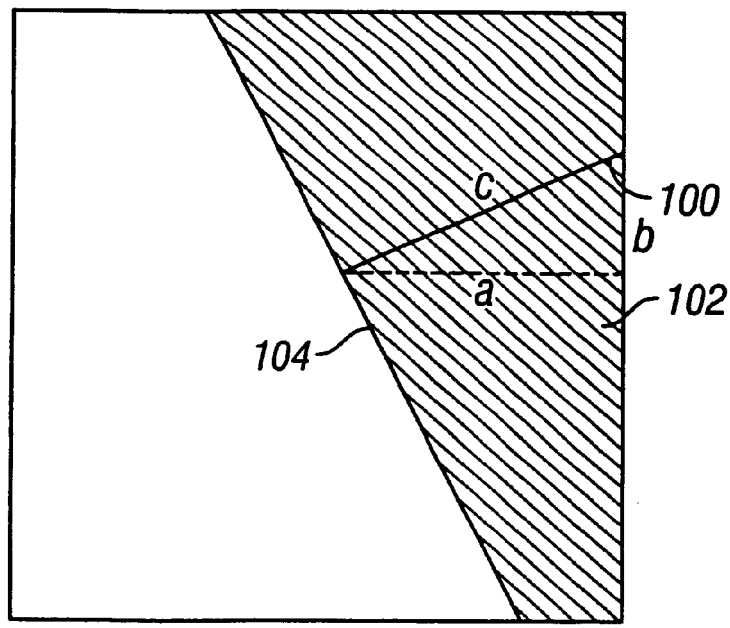
FIG. 3 is a diagram illustrating a single pixel containing an endpoint of a line.

As depicted in FIG. 3, traditional anti-aliasing techniques draw endpoints of a line by varying intensities of pixels to make the far side of the endpoint appear to be diagonal in relation to the x-axis, except in the case where the line being drawn is perfectly horizontal or vertical. This diagonal far side 104 causes the computation of the area of the shaded region to be fairly complex and additional pixels may have to be taken into account when the slope of the line causes the endpoint to bleed into several pixels.

Figure 4:
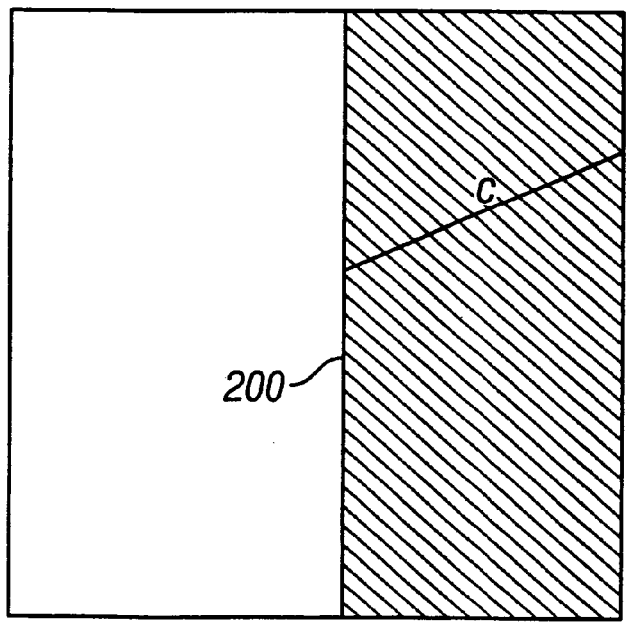
FIG. 4 is a diagram illustrating the line c from FIG. 3 drawn using the anti-aliasing technique of a presently preferred embodiment of the present invention.

In the present invention, the cap is drawn as rectangular, rather than trapezoidal, no matter what the angle of the line is, with the far side being parallel or perpendicular to the x-axis. FIG. 4 is a diagram illustrating the line c 100 from FIG. 3 drawn using the anti-aliasing technique of a presently preferred embodiment of the present invention. Far side 200 is now perpendicular to the x-axis. Now the computation of the area of the shaded region can be performed without any inverse squares, as the area of a rectangle can be determined by simply multiplying its width by its height in the case of a square filter (One of ordinary skill in the art will recognize that a similar solution can also be achieved using a Gaussian, conical, or other shaped filter rather than a square filter). Additionally, the human eye will not notice any significant difference between the endpoint drawn using the old anti-aliasing techniques and the endpoint drawn using the anti-aliasing technique of a presently preferred embodiment of the present invention.

Figure 5A:
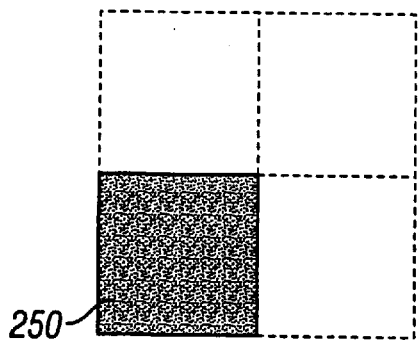
FIG. 5A is a diagram illustrating an example of a case in which the shaded region of a cap falls precisely within a single pixel.

This is accomplished by first computing a square, at one corner of which is the mathematical origin (or endpoint) of the line segment, and the length of any side being the thickness of the line segment. For purposes of this application, this area may be termed the "shaded region". The region may be chosen so that the mathematical origin lies at any corner, but in a presently preferred embodiment of the present invention, the mathematical origin will lie in the bottom left corner of the shaded region. For illustrative purposes, this application will assume a line thickness of one pixel. However, one of ordinary skill in the art will recognize that the same or similar techniques could be applied to lines having any thickness. If the shaded region falls precisely within a single pixel, then the depiction of that origin on a computer display may normally be as easy as lighting up the pixel at the intensity level of the line. FIG. 5A is a diagram illustrating an example of a case where the shaded region 250 falls precisely within a single pixel P1.

Figure 5B:
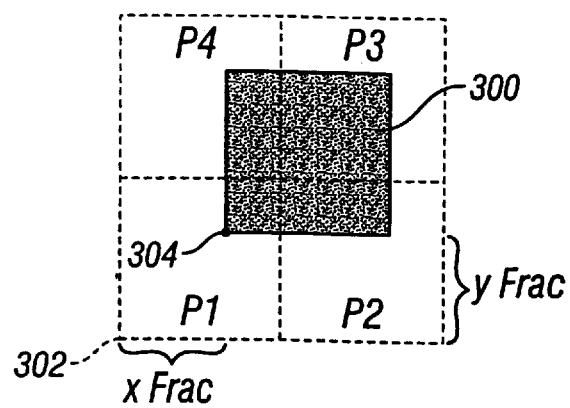
FIG. 5B is a diagram illustrating an example of a case in which the shaded region of a cap falls within the purview of four pixels.

However, it is much more common for the shaded region to fall over several pixels. FIG. 5B is a diagram illustrating an example of a case where the shaded region 300 falls within the purview of four pixels, labeled P1, P2, P3, and P4. In such a case, the intensities of the four pixels P1, P2, P3, and P4 may be individually altered so as to give the appearance of the square being precisely placed at its proper location. The details of such a procedure are outside the scope of this application. Therefore, for purposes of this application, such a procedure will be described only as far as the determination of what intensities each pixel must display.

To determine the intensities of the pixels containing the shaded region, the distances from a fixed point at one of the corners of the 4-pixel grouping must be computed (there of course, may be more pixels involved if the line segment thickness is greater). For simplicity, the corner chosen is the bottom left-hand corner 302. Then an x-fraction (xfrac) and y-fraction (yfrac) are determined as (respectively) the distance of the mathematical origin 304 from that chosen corner point (since the mathematical origin, as discussed earlier, is at the bottom left hand corner of the shaded region 300). The length of any pixel is 1.0, therefore xfrac and yfrac will each be between 0 and 1. It should be noted that it is not necessary for either the mathematical origin 304 or the corner chosen for measurement 302 be in the bottom left corner. The same or similar results can be achieved by measuring the distances from any corner of the four pixels P1, P2, P3, P4 to the closest corner of the shaded region 300.

Once xfrac and yfrac are determined, the intensities of the various pixels may be computed using the following formulas:

P1: $(1.0-xfrac)*(1.0-yfrac)$
P2: $xfrac*(1.0-yfrac)$
P3: $xfrac*yfrac$
P4: $(1.0-xfrac)*yfrac$ Again, this formula is streamlined under the assumption that the mathematical origin and corner chosen for measurement are both in the bottom left hand corner, with P1 being the pixel containing both those corners, and the pixels counting upwards as they extend counter-clockwise. This formula may be modified if any of these assumptions are varied.

This in essence gives the overlapped area on each pixel. These values may be adjusted by the full intensity value of the line segment being drawn, which yields the normalized intensity value of each pixel being covered by the true origin. If the line thickness is such that some pixels in the middle of the origin are completely shaded, obviously that would require no further calculations. There will always be no more than 4 pixels covered by the shaded region which require calculations in order to vary their intensities (at most 4 pixels being only partially shaded).

Figure 6:
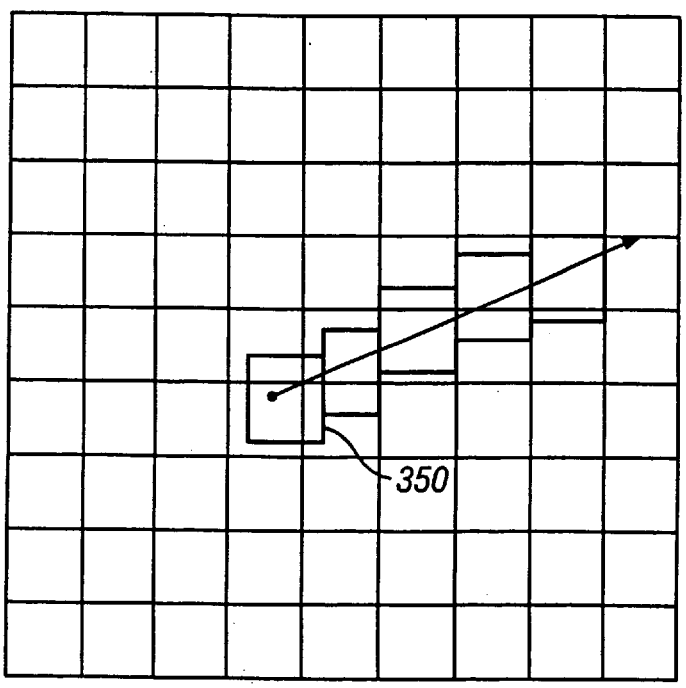
FIG. 6 is a diagram illustrating a problem with using four pixels to draw a cap of a line segment.
Figure 7:
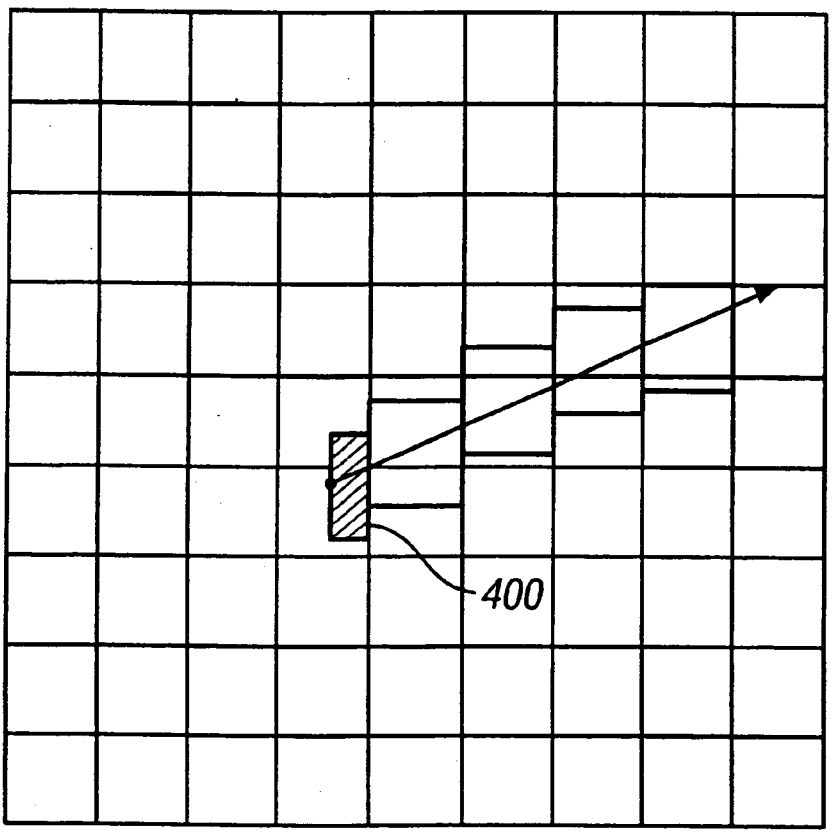
FIG. 7 is a diagram illustrating a sampling of a line in accordance with a presently preferred embodiment of the present invention.

When a line is not perfectly horizontal or vertical, a problem is encountered in that one does not necessarily wish to use four (or more) pixels to draw the endpoint, as that may result in more problems with the staircase effect. FIG. 6 is a diagram illustrating a problem with using four pixels to draw the starting point of a line segment. The intensity applied to the portion of pixel 350 may be too intense given the slope of the line and could give the impression that the line actually starts out by moving in the horizontal direction before moving in its true direction. FIG. 7 is a diagram illustrating a preferable sampling of the line, where the horizontal extension of the first few pixels 400 is not as prevalent.

Therefore, while it is useful to "sample" the starting and ending points of a line segment using four pixels, it is preferable to only draw them using two pixels. The question then becomes, which two pixels? Obviously the pixels should be contiguous, and also should be placed so that the "direction" of the cap is the same as the direction in which the line extends (i.e. if the line extends more vertically than horizontally, the two pixels should be contiguous horizontally, while if the line extends more horizontally than vertically, the two pixels should be contiguous vertically). An additional choice might be to have that the two pixels chosen such that one of them contains the mathematical origin. Therefore, only the intensities of the two pixels to be illuminated for the starting or end cap need to be computed. This also has the advantage of saving on computing time.

Figure 8A:
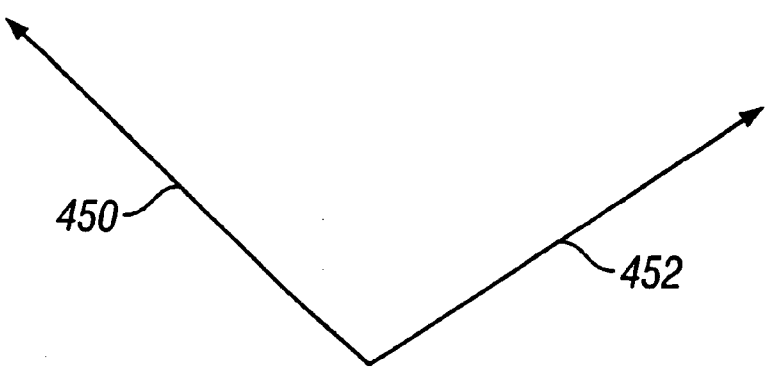
FIG. 8A is a diagram illustrating a mathematical representation of two line segments originating from the same point yet extending in different directions.
Figure 8B:
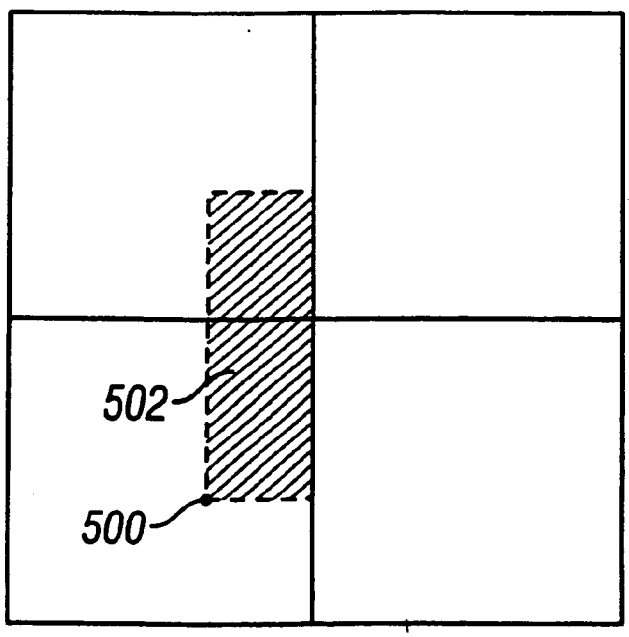
FIG. 8B is a diagram illustrating how a four pixel grouping may display the starting caps of the two line segments of FIG. 8A.

A problem, however, may be encountered if this method is applied. When two lines originate at the same point yet extend in different directions, there may be a perceptual problem that appears. FIGS. 8A–8F are diagrams illustrating such a problem. FIG. 8A is a diagram illustrating a mathematical representation of what two line segments 450 and 452 originating from the same point yet extending in different directions should look like. FIG. 8B is a diagram illustrating how a four pixel grouping using the method outlined above would display the origin points of the two line segments. Point 500 is the mathematical origin of both line segments. According to the scheme described above, the region illuminated for line 450 is region 502, while the same region would be illuminated for line 452.

Figure 8C:
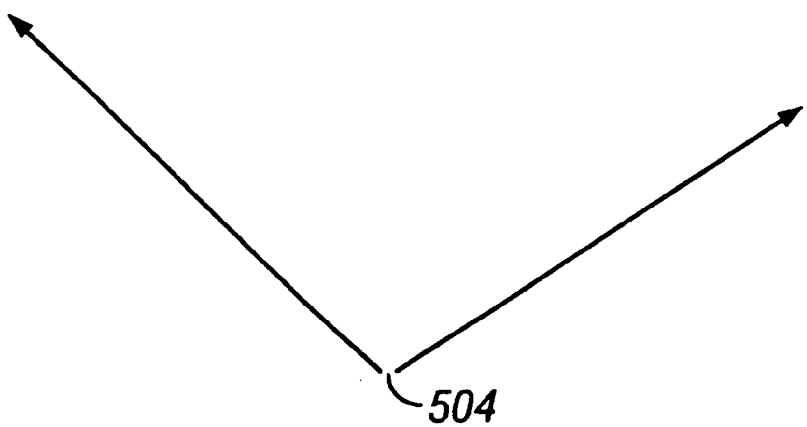
FIG. 8C is a diagram illustrating how drawing the starting caps using the four pixel grouping of FIG. 8B may create a problem on a computer display.

FIG. 8C, however, is a diagram illustrating how drawing the starting points according to this scheme may create a problem on a computer display. The lines may appear to not completely connect at area 504.

Figure 8D:
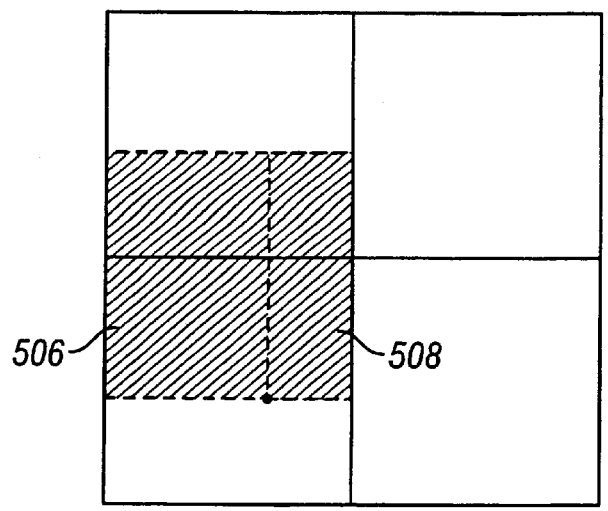
FIG. 8D is a diagram illustrating how a four pixel grouping according to an older scheme may display the starting caps of the two line segments of FIG. 8A.

Under an old scheme, the corner of the shaded region having the mathematical origin would actually vary according to the direction of the line segment. Thus, line 450 would have the origin in the bottom right hand corner rather than the lower left. FIG. 8D is a diagram illustrating the four pixel grouping according to this older scheme, where line segment 450 would produce a starting cap in region 506, while line segment 452 would produce a starting cap in region 508.

Figure 8E:
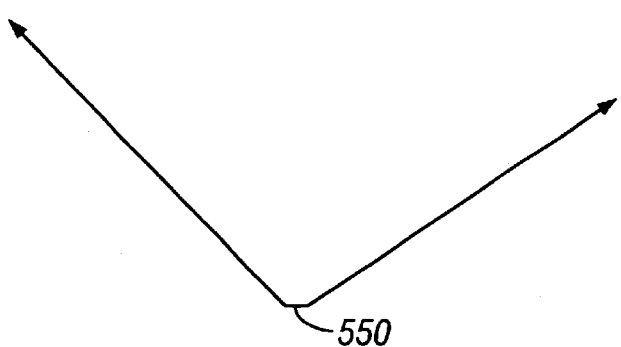
FIG. 8E is a diagram illustrating how drawing the starting caps using the four pixel grouping of FIG. 8D may create a problem on a computer display.
Figure 8F:
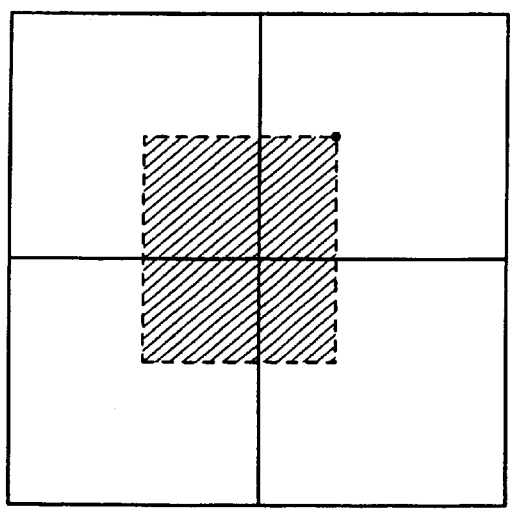
FIG. 8F is a diagram illustrating the orientation of regions drawn for the starting caps of the two line segments of FIG. 8A in accordance with a presently preferred embodiment of the present invention.

FIG. 8E, however, is a diagram illustrating how drawing the starting points according to this scheme may also create a problem on a computer display. The origin point 550 may appear as a horizontal segment. Additionally, line segment 450 might appear shifted over one pixel to the left. In order to remedy all these situations, it is preferable to draw the origin points in different pixels even though the mathematical origins of the two line segments are identical. FIG. 8F is a diagram illustrated the preferred orientation of the regions drawn for the starting caps for line segments 450 and 452.

According to a presently preferred embodiment of the present invention, the caps of a line are not always drawn covering the pixel that contains its mathematical origin. As described earlier, the cap is still drawn with two pixels rather than four, and the orientation of the pixels being drawn still corresponds to the four pixel sampling configuration determined earlier. However, the two pixels actually illuminated are chosen according to the following formula:

starting cap:
  (1) if the line is extending in the positive direction, the pixels are chosen according to the normal scheme (including the pixel containing the mathematical origin)

(2) if the line is extending in the negative direction, the pixels chosen are offset by one pixel (pixels opposite the pixel containing the mathematical origin)

ending cap:

(1) if the line is extending in the negative direction, the pixels are chosen according to the normal scheme (including the pixel containing the mathematical origin)

(2) if the line is extending in the positive direction, the pixels chosen are offset by one pixel (pixels opposite the pixel containing the mathematical origin)

This formula may then be simplified by stating that the said normalized intensity values for a starting cap are zero for any shaded pixels on a side of said group of shaded pixels in the same direction as said direction of said line segment if said direction is between −45 degrees and 135 degrees, said normalized intensity values being zero for any shaded pixels on a side of said group of shaded pixels in the opposite direction as said direction of said line segment if said direction of said line segment is between 135 degrees and 180 degrees or between −45 degrees and −180 degrees. Additionally, only the intensities for the two pixels which are going to represent the endpoint need be calculated.

Similarly, the normalized intensity values for an ending cap are zero for any shaded pixels on a side of said group of shaded pixels in the opposite direction as said direction of said line segment if said direction is between −45 degrees and 135 degrees, said normalized intensity values being zero for any shaded pixels on a side of said group of shaded pixels in the same direction as said direction of said line segment if said direction of said line segment is between 135 degrees and 180 degrees or between −45 degrees and −180 degrees.

Figure 9A:
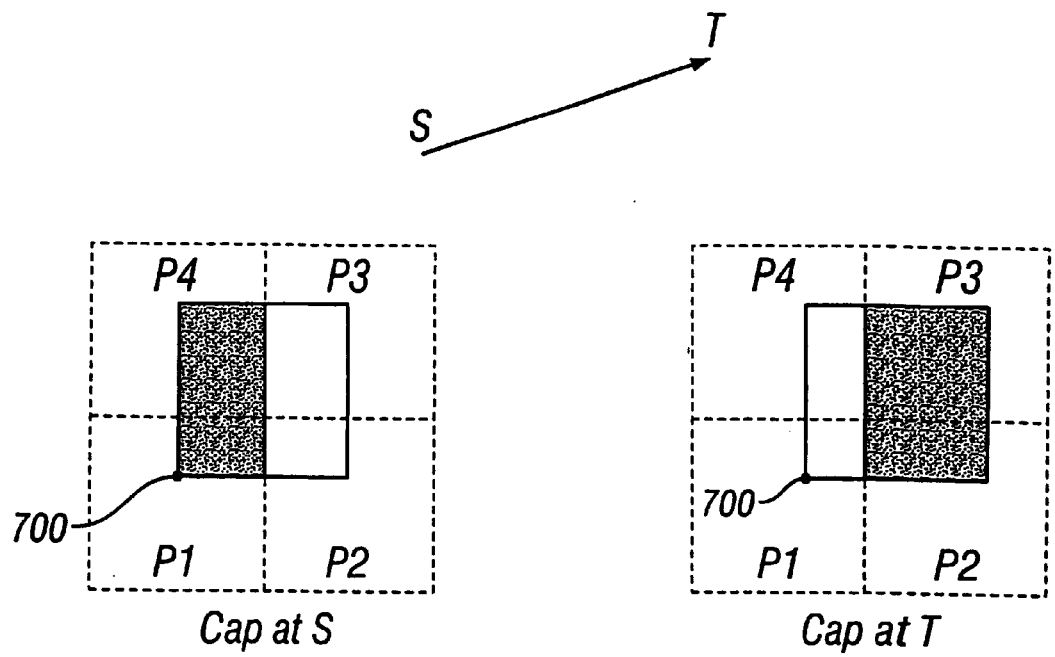
FIG. 9A is a diagram illustrating a line segment extending in the direction of the first octant in accordance with a presently preferred embodiment of the present invention.

FIGS. 9A–9H are diagrams illustrating how this formula applies to line segments in each of the eight octants. FIG. 9A is a diagram illustrating a line segment extending in the direction of the first octant. Since the line is extending more horizontally than vertically, the pixels chosen to draw both the starting and ending caps are contiguous vertically. Since the line extends in the positive horizontal direction, the starting cap is drawn according to the normal scheme (including the pixel having the mathematical origin 700) and the ending cap is drawn using the pixels opposite the pixel having the mathematical origin.

Figure 9B:
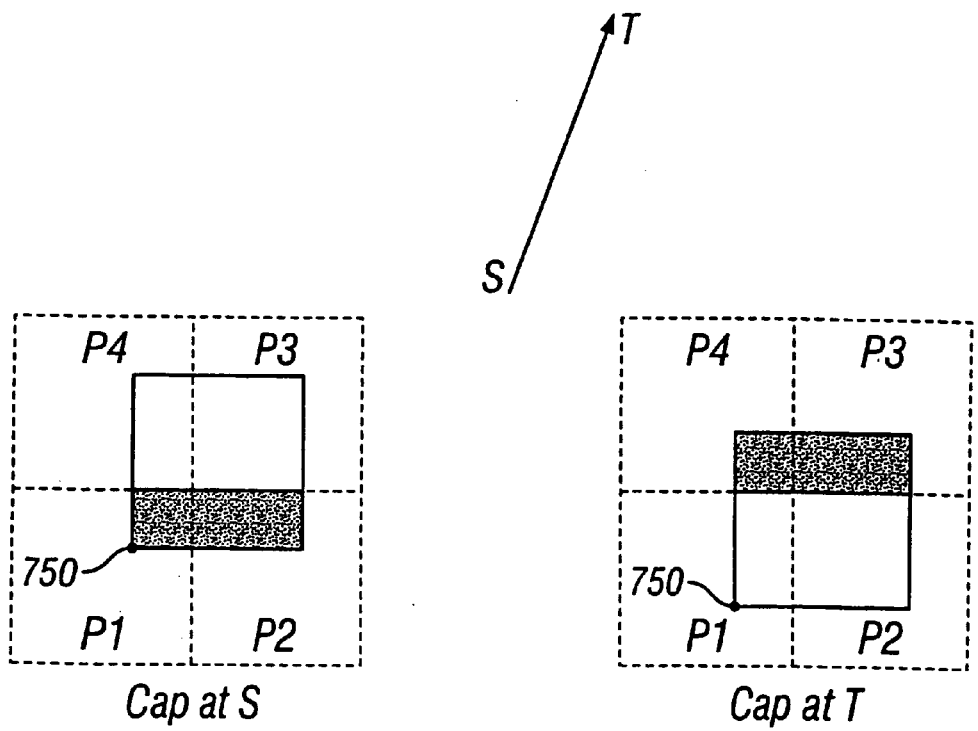
FIG. 9B is a diagram illustrating a line segment extending in the direction of the second octant in accordance with a presently preferred embodiment of the present invention.

FIG. 9B is a diagram illustrating a line segment extending in the direction of the second octant. Since the line is extending more vertically than horizontally, the pixels chosen to draw both the starting and ending caps are contiguous horizontally. Since the line extends in the positive vertical direction, the starting cap is drawn according to the normal scheme (including the pixel having the mathematical origin 750) and the ending cap is drawn using the pixels opposite the pixel having the mathematical origin.

Figure 9C:
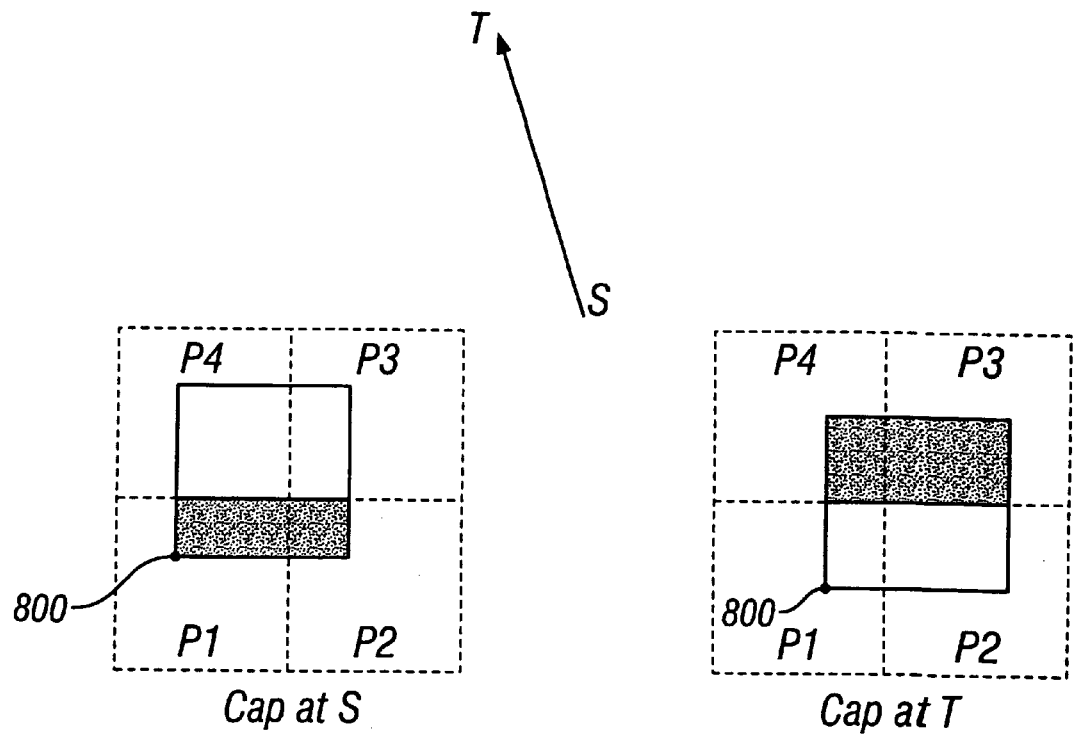
FIG. 9C is a diagram illustrating a line segment extending in the direction of the third octant in accordance with a presently preferred embodiment of the present invention.

FIG. 9C is a diagram illustrating a line segment extending in the direction of the third octant. Since the line is extending more vertically than horizontally, the pixels chosen to draw both the starting and ending caps are contiguous horizontally. Since the line extends in the positive vertical direction, the starting cap is drawn according to the normal scheme (including the pixel having the mathematical origin 800) and the ending cap is drawn using the pixels opposite the pixel having the mathematical origin.

Figure 9D:
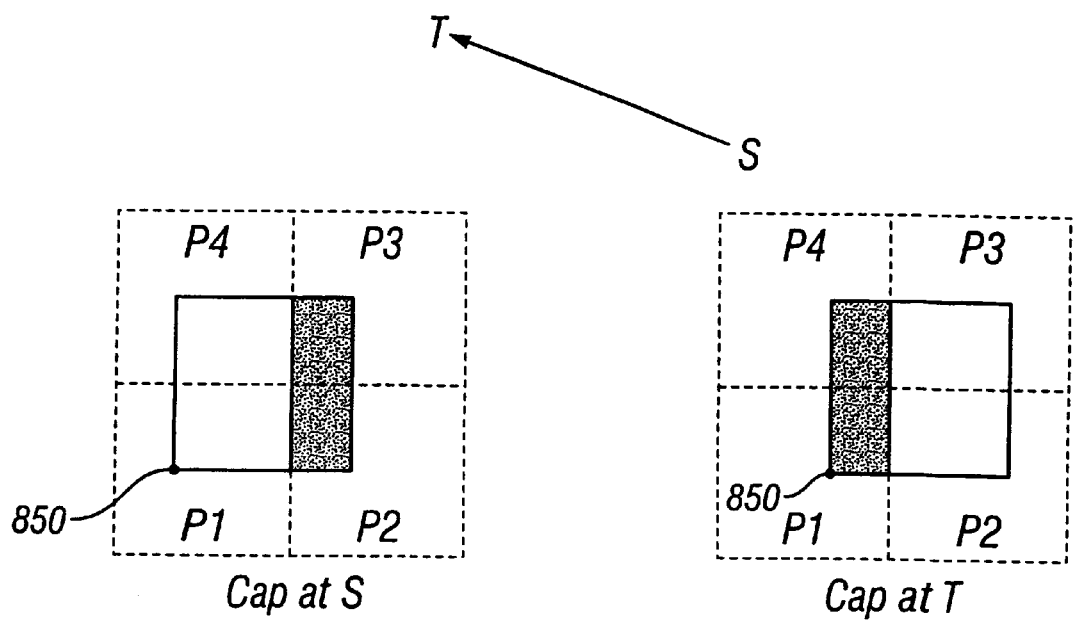
FIG. 9D is a diagram illustrating a line segment extending in the direction of the fourth octant in accordance with a presently preferred embodiment of the present invention.

FIG. 9D is a diagram illustrating a line segment extending in the direction of the fourth octant. Since the line is extending more horizontally than vertically, the pixels chosen to draw both the starting and ending caps are contiguous vertically. Since the line extends in the negative horizontal direction, the starting cap is drawn using the pixels opposite the pixel having the mathematical origin and the ending cap is drawn according to the normal scheme (including the pixel having the mathematical origin 850).

Figure 9E:
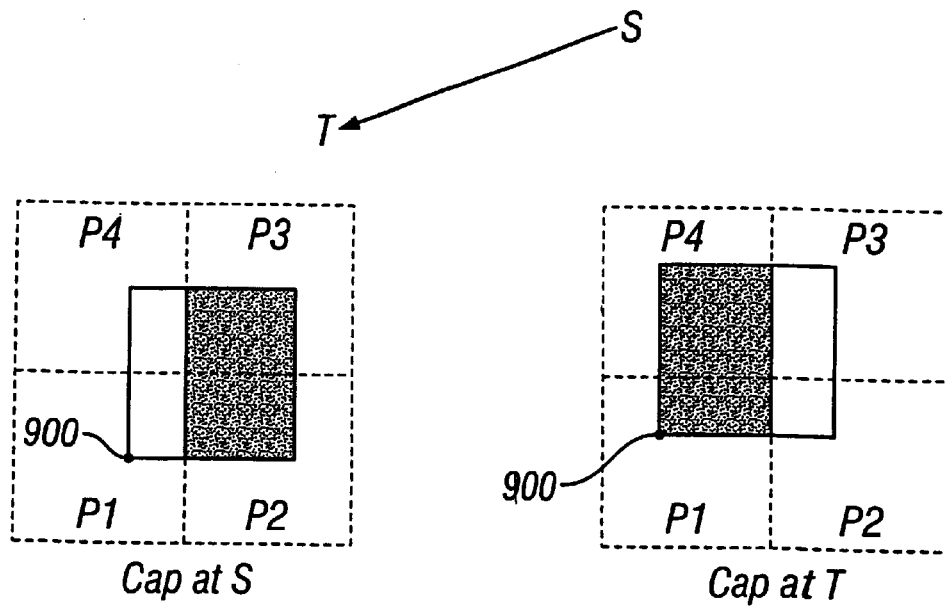
FIG. 9E is a diagram illustrating a line segment extending in the direction of the fifth octant in accordance with a presently preferred embodiment of the present invention.

FIG. 9E is a diagram illustrating a line segment extending in the direction of the fifth octant. Since the line is extending more horizontally than vertically, the pixels chosen to draw both the starting and ending caps are contiguous vertically. Since the line extends in the negative horizontal direction, the starting cap is drawn using the pixels opposite the pixel having the mathematical origin and the ending cap is drawn according to the normal scheme (including the pixel having the mathematical origin 900).

Figure 9F:
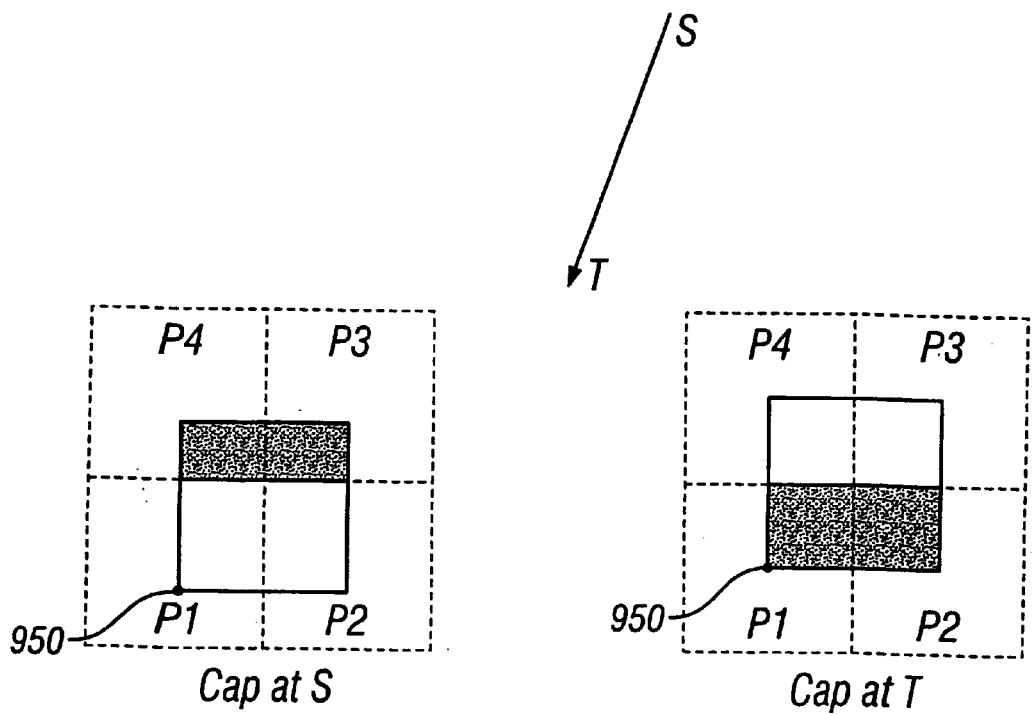
FIG. 9F is a diagram illustrating a line segment extending in the direction of the sixth octant in accordance with a presently preferred embodiment of the present invention.

FIG. 9F is a diagram illustrating a line segment extending in the direction of the sixth octant. Since the line is extending more vertically than horizontally, the pixels chosen to draw both the starting and ending caps are contiguous horizontally. Since the line extends in the negative vertical direction, the starting cap is drawn using the pixels opposite the pixel having the mathematical origin and the ending cap is drawn according to the normal scheme (including the pixel having the mathematical origin 950).

Figure 9G:
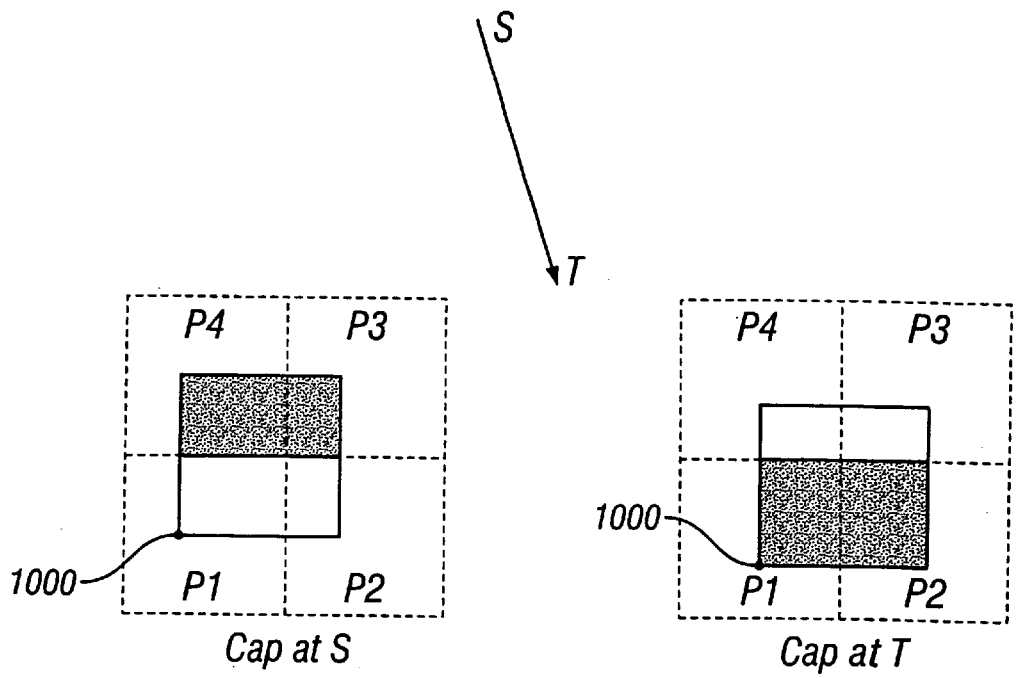
FIG. 9G is a diagram illustrating a line segment extending in the direction of the seventh octant in accordance with a presently preferred embodiment of the present invention.

FIG. 9G is a diagram illustrating a line segment extending in the direction of the seventh octant. Since the line is extending more vertically than horizontally, the pixels chosen to draw both the starting and ending caps are contiguous horizontally. Since the line extends in the negative vertical direction, the starting cap is drawn using the pixels opposite the pixel having the mathematical origin and the ending cap is drawn according to the normal scheme (including the pixel having the mathematical origin 1000).

Figure 9H:
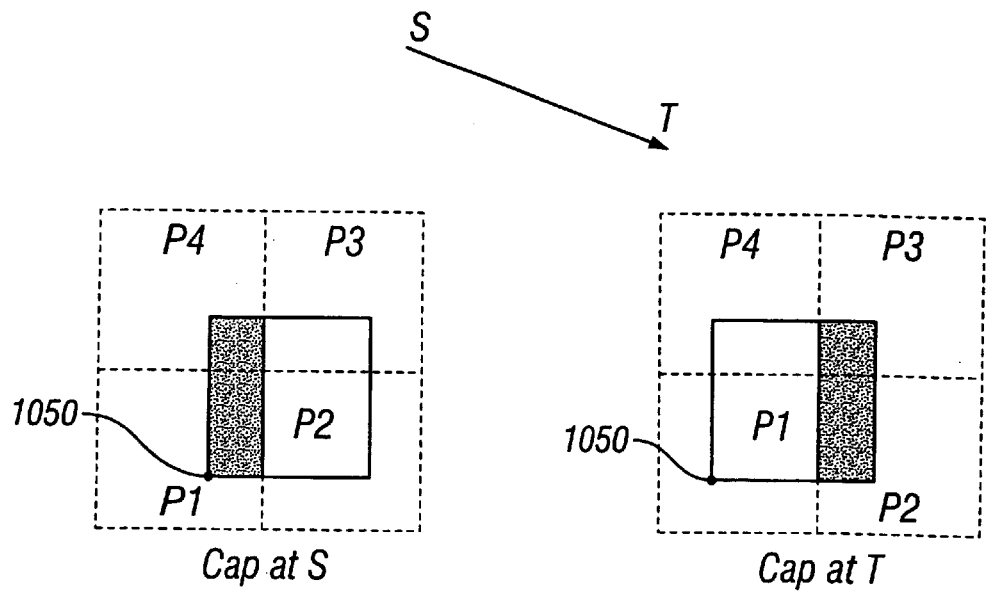
FIG. 9H is a diagram illustrating a line segment extending in the direction of the eighth octant in accordance with a presently preferred embodiment of the present invention.

FIG. 9H is a diagram illustrating a line segment extending in the direction of the eighth octant. Since the line is extending more horizontally than vertically, the pixels chosen to draw both the starting and ending caps are contiguous vertically. Since the line extends in the positive horizontal direction, the starting cap is drawn according to the normal scheme (including the pixel having the mathematical origin 1050) and the ending cap is drawn using the pixels opposite the pixel having the mathematical origin.

Figure 10A:
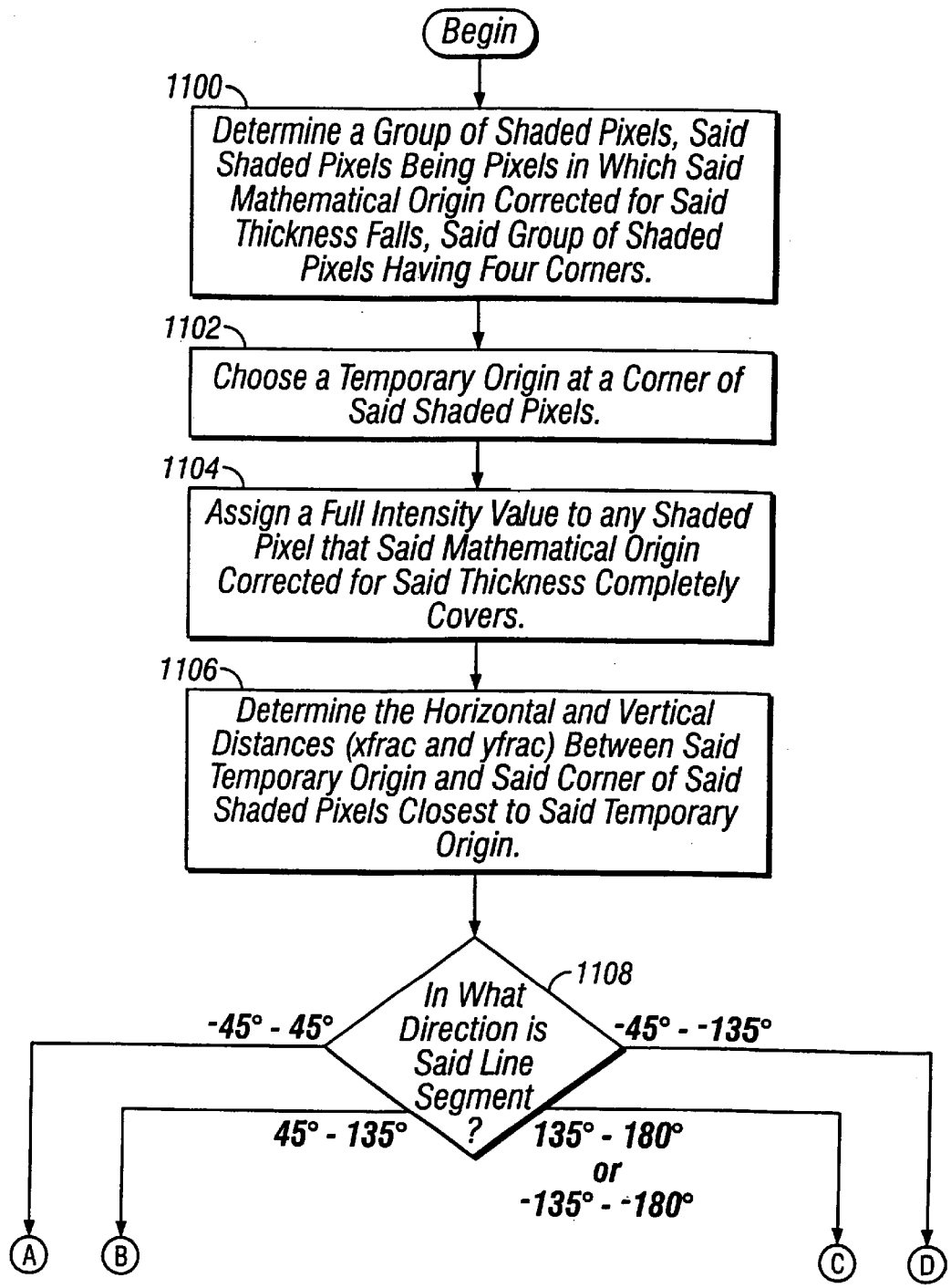
FIG. 10 is a flow diagram illustrating a method for plotting a starting cap of a line segment on a computer display in accordance with a presently preferred embodiment of the present invention.
Figure 10B:
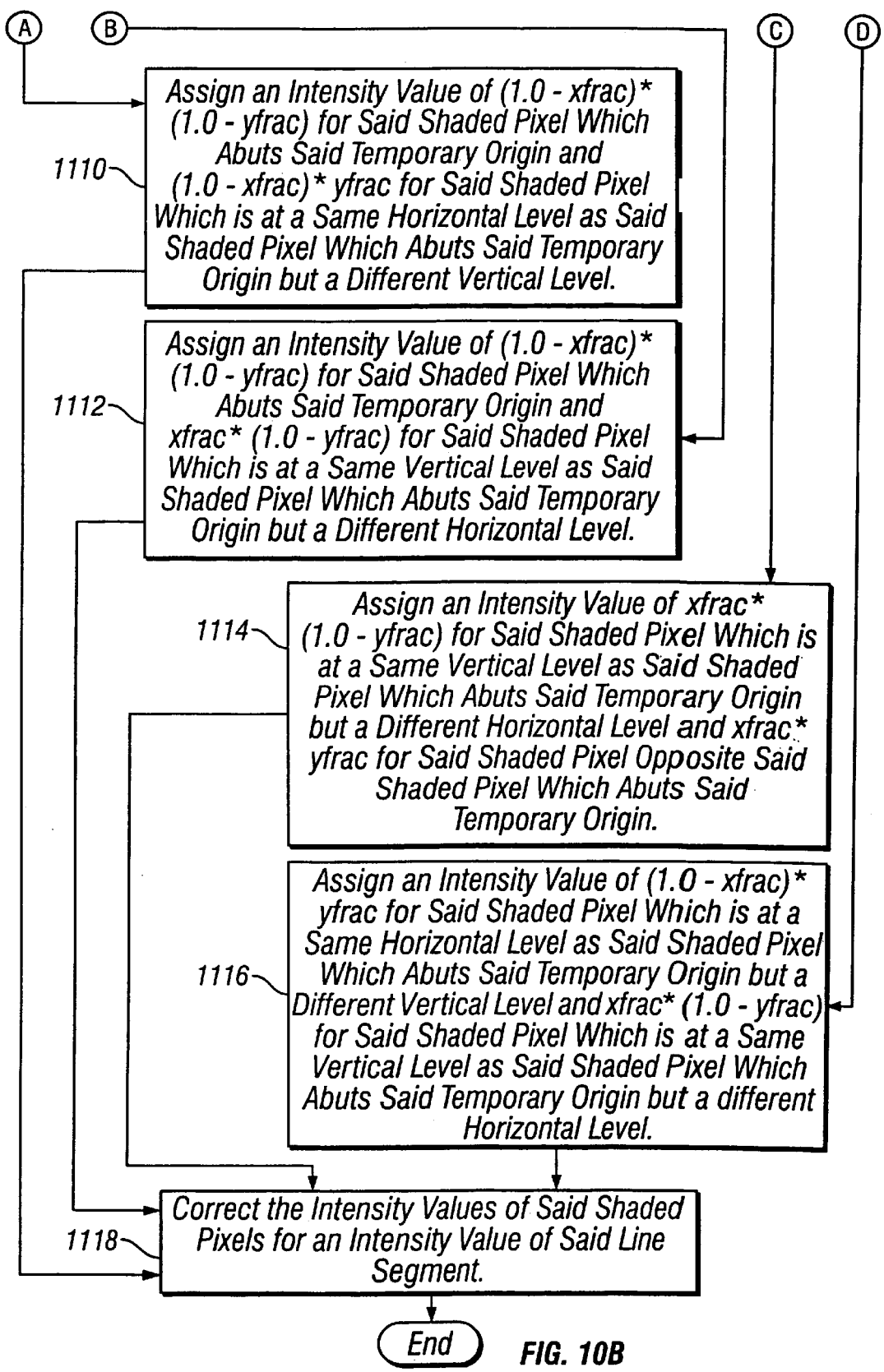

FIG. 10 is a flow diagram illustrating a method for plotting a starting cap of a line segment on a computer display, said computer display comprising a plurality of pixels with an x-axis, wherein said x-axis in a positive direction has a direction of 0 degrees, said line segment having a mathematical origin, a direction, and a thickness, in accordance with a presently preferred embodiment of the present invention.

At 1100, a group of shaded pixels is determined, said shaded pixels being pixels in which said mathematical origin corrected for said thickness falls, said group of shaded pixels having four corners. At 1102, a sample origin is chosen at a corner of said shaded pixels. Then, at 1104, a full normalized intensity value is assigned to any shaded pixel that said mathematical origin corrected for said thickness completely covers.

At 1106, the horizontal and vertical distances (xfrac and yfrac) between said sample origin and said corner of said shaded pixels closest to said sample origin are determined. Then, at 1108, the direction of the line segment is determined. If the direction of the line segment is between −45 degrees and 45 degrees, at 1110 a normalized intensity value of (1.0−xfrac)*(1.0−yfrac) is assigned for said shaded pixel which abuts said sample origin and (1.0−xfrac)*yfrac is assigned for said shaded pixel which is at a same horizontal level as said shaded pixel which abuts said sample origin but a different vertical level.

If the direction of said line segment is between 45 degrees and 135 degrees, at 1112 a normalized intensity value of (1.0−xfrac)*(1.0−yfrac) is assigned for said shaded pixel which abuts said sample origin and xfrac*(1.0−yfrac) is assigned for said shaded pixel which is at a same vertical level as said shaded pixel which abuts said sample origin but a different horizontal level.

If the direction of said line segment is between 135 degrees and 180 degrees or between −135 degrees and −180 degrees, at 1114 a normalized intensity value of xfrac*(1.0−yfrac) is assigned for said shaded pixel which is at a same vertical level as said shaded pixel which abuts said sample origin but a different horizontal level and xfrac*yfrac is assigned for said shaded pixel opposite said shaded pixel which abuts said sample origin.

If said direction of said line segment is between −45 degrees and −135 degrees, at 1116 a normalized intensity value of (1.0−xfrac)*yfrac is assigned for said shaded pixel which is at a same horizontal level as said shaded pixel which abuts said sample origin but a different vertical level and xfrac*(1.0−yfrac) is assigned for said shaded pixel which is at a same vertical level as said shaded pixel which abuts said sample origin but a different horizontal level.

Lastly, at 1118, the normalized intensity values of the shaded pixels may be corrected for a normalized intensity value of the line segment.

Figure 11A:
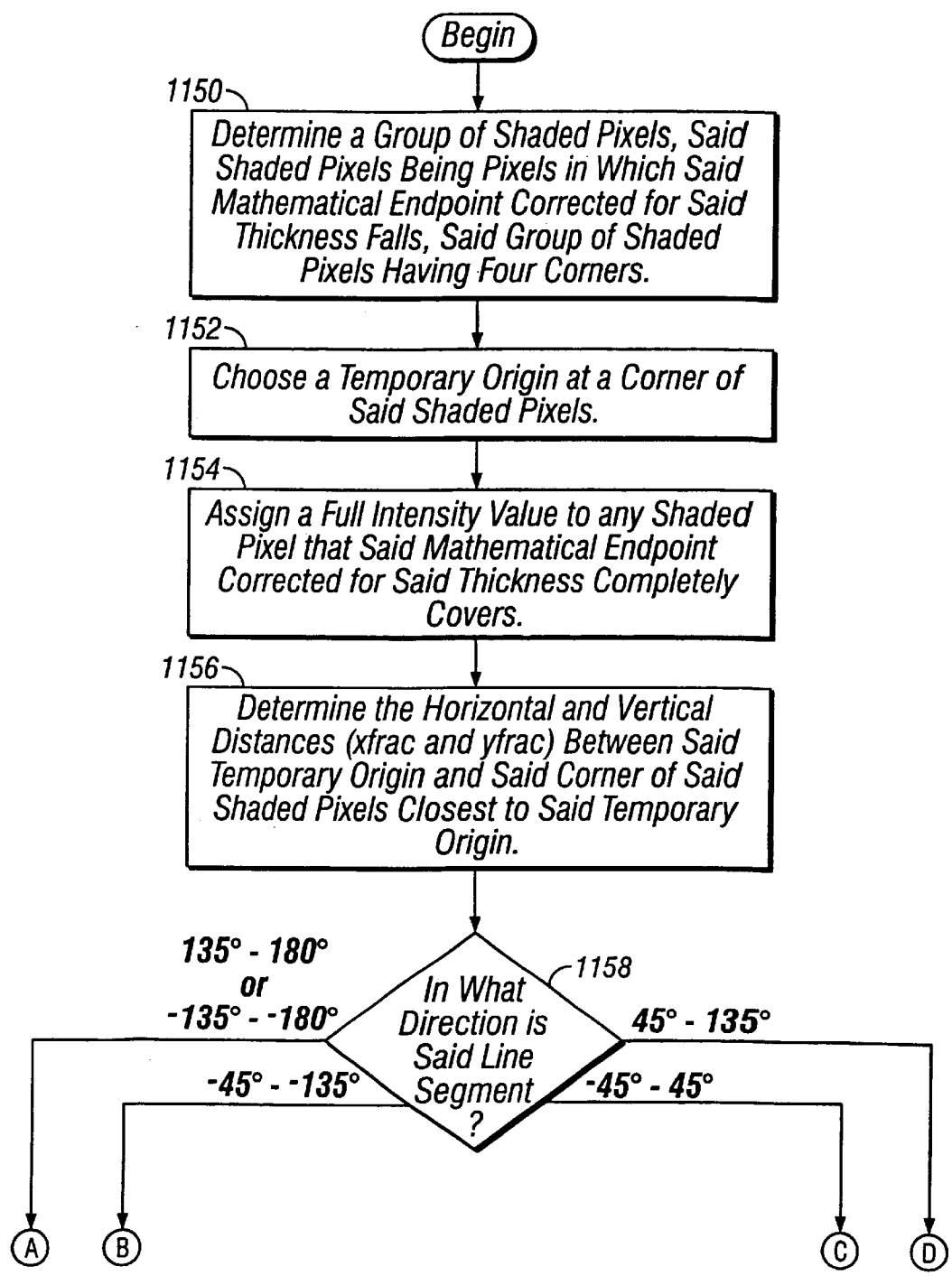
FIG. 11 is a flow diagram illustrating a method for plotting an ending cap of a line segment on a computer display in accordance with a presently preferred embodiment of the present invention.
Figure 11B:
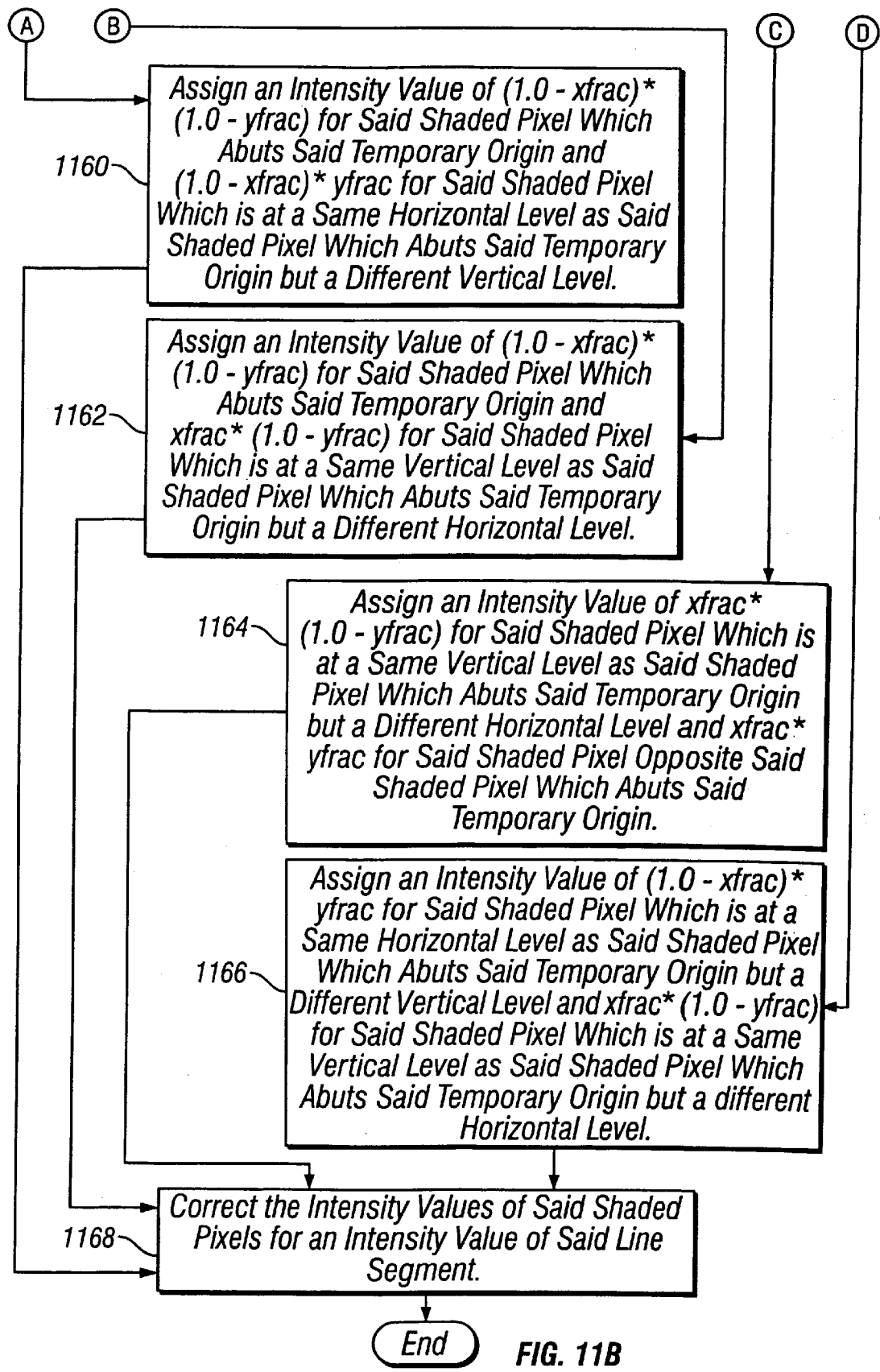

FIG. 11 is a flow diagram illustrating a method for plotting an ending cap of a line segment on a computer display, said computer display comprising a plurality of pixels with an x-axis, wherein said x-axis in a positive direction has a direction of 0 degrees, said line segment having a mathematical endpoint, a direction, and a thickness, in accordance with a presently preferred embodiment of the present invention.

At 1150, a group of shaded pixels is determined, said shaded pixels being pixels in which said mathematical origin corrected for said thickness falls, said group of shaded pixels having four corners. At 1152, a sample origin is chosen at a corner of said shaded pixels. Then, at 1154, a full normalized intensity value is assigned to any shaded pixel that said mathematical endpoint corrected for said thickness completely covers.

At 1156, the horizontal and vertical distances (xfrac and yfrac) between said sample origin and said corner of said shaded pixels closest to said sample origin are determined. Then, at 1158, the direction of the line segment is determined. If the direction of the line segment is between 135 degrees and 180 degrees or between −135 degrees and −180 degrees, at 1160 a normalized intensity value of (1.0−xfrac)*(1.0−yfrac) is assigned for said shaded pixel which abuts said sample origin and (1.0−xfrac)* yfrac is assigned for said shaded pixel which is at a same horizontal level as said shaded pixel which abuts said sample origin but a different vertical level.

If the direction of said line segment is between −45 degrees and −135 degrees, at 1162 a normalized intensity value of (1.0−xfrac)*(1.0−yfrac) is assigned for said shaded pixel which abuts said sample origin and xfrac*(1.0−yfrac) is assigned for said shaded pixel which is at a same vertical level as said shaded pixel which abuts said sample origin but a different horizontal level.

If the direction of said line segment is between −45 degrees and 45 degrees, at 1164 a normalized intensity value of xfrac*(1.0−yfrac) is assigned for said shaded pixel which is at a same vertical level as said shaded pixel which abuts said sample origin but a different horizontal level and xfrac*yfrac is assigned for said shaded pixel opposite said shaded pixel which abuts said sample origin.

If said direction of said line segment is between 45 degrees and 135 degrees, at 1166 a normalized intensity value of (1.0−xfrac)*yfrac is assigned for said shaded pixel which is at a same horizontal level as said shaded pixel which abuts said sample origin but a different vertical level and xfrac*(1.0−yfrac) is assigned for said shaded pixel which is at a same vertical level as said shaded pixel which abuts said sample origin but a different horizontal level.

Lastly, at 1168, the normalized intensity values of the shaded pixels may be corrected for an intensity value of the line segment.

Rather than performing discrete calculations, a loop-up table may be used which contains the proper normalized intensity values for pixels based on the criteria outlined above. FIG. 12 is an example of a look-up table which may be used with a presently preferred embodiment of the present invention.

Figure 13:
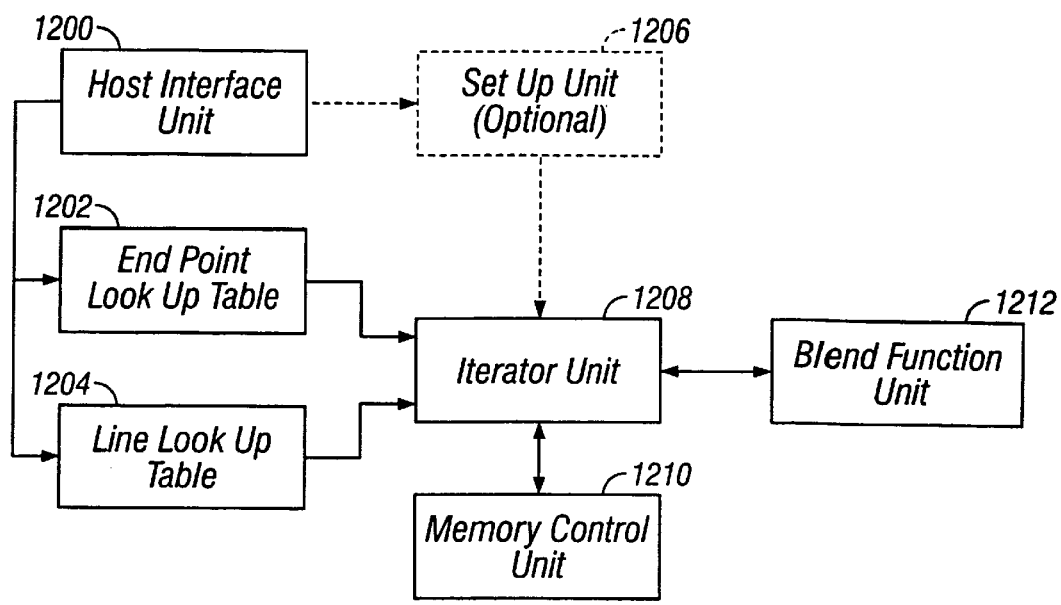
FIG. 13 is a block diagram illustrating a hardware apparatus for the plotting of a starting or ending cap of a line segment on a computer display in accordance with a presently preferred embodiment of the present invention.

FIG. 13 is a block diagram illustrating a hardware apparatus for the plotting of a starting or ending cap of a line segment on a computer display in accordance with a presently preferred embodiment of the present invention. A host interface unit 1200 contains registers which stores any parameters needed. It also may contain an address decoder to select which register is being accessed. The host interface unit 1200 also controls accesses to the look-up tables 1202, 1204. Additionally, if a set-up unit 1206 is implemented in hardware, the host interface is responsible for sending parameters needed to the setup unit once a drawing command is received from the host.

The end point look-up table 1202 stores pixel coverage values for both starting and ending caps. The line look-up table 1204 stores line segment pixel coverage areas. A set-up unit 1206 is an optional unit which calculates various parameters. The more calculations it performs, the less information needs to be retrieved from look-up tables 1202, 1204.

An iterator unit 1208 performs line segment iteration (outside the scope of this application) and may aid in calculating the ending cap.

A memory control unit 1210 performs memory read and write accesses related to each pixel's data. Write access is performed once the final attributes data is calculated. Read access is performed when data is needed for blending or for depth calculation, or any other attributes.

A blend function unit 1212 may perform arithmatics needed to do blend functions for each pixel (outside the scope of this application).

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. An apparatus for plotting a starting cap of a line segment on a computer display, said computer display comprising a plurality of pixels in a rectilinear array, said line segment having a mathematical origin and a thickness, the apparatus comprising:

means for determining a mathematical origin corrected for said thickness by computing a square having said mathematical origin at one corner of said square, said square being aligned horizontally and vertically with said rectilinear array of pixels and each side of said square having a length equal to said thickness;

means for determining a group of shaded pixels, said shaded pixels being pixels in which said mathematical origin corrected for said thickness falls, said group of shaded pixels having four corners;

means for choosing a sample origin at a corner of said shaded pixels;

means for assigning a full normalized intensity value to any shaded pixel that said mathematical origin corrected for said thickness completely covers; and means for assigning normalized intensity values to said shaded pixels that said mathematical origin corrected for said thickness does not completely cover based on the area of said mathematical origin corrected for said thickness lying within each shaded pixel.

2. The apparatus of claim 1, wherein said corner of said square is a bottom left corner of said square and said sample origin is a bottom left corner of said group of shaded pixels.

3. The apparatus of claim 1, wherein each of said pixels has assigned length of 1.0 and wherein said means for assigning a full normalized intensity value includes means for assigning a normalized intensity value of 1.0 to any pixel that said mathematical origin corrected for said thickness completely covers.

4. The apparatus of claim 3, wherein said means for assigning normalized intensity values includes:

means for determining horizontal and vertical distances (xfrac and yfrac) between said sample origin and said corner of said shaded pixels closest to said sample origin;

means for assigning a normalized intensity value of (1.0−xfrac)*(1.0−yfrac) for said shaded pixel which abuts said sample origin;

means for assigning a normalized intensity value of xfrac*yfrac for said shaded pixel opposite said shaded pixel which abuts said sample origin;

means for assigning a normalized intensity value of xfrac*(1.0−yfrac) for said shaded pixel which is at a same vertical level as said shaded pixel which abuts said sample origin but a different horizontal level; and means for assigning a normalized intensity value of (1.0−xfrac)*yfrac for said shaded pixel which is at a same horizontal level as said shaded pixel which abuts said sample origin but a different vertical level.

5. The apparatus of claim 1, wherein said normalized intensity values for said shaded pixels are further corrected for an intensity value of said line segment.

6. An apparatus for plotting an ending cap of a line segment on a computer display, said computer display comprising a plurality of pixels in a rectilinear array, said line segment having a mathematical end point and a thickness, the apparatus comprising:

means for determining a mathematical end point corrected for said thickness by computing a square having sa id mathematical end point at one corner of said square, said square being aligned horizontally and vertically with said rectilinear array of pixels and each side of said square having a length equal to said thickness;

means for determining a group of shaded pixels, said shaded pixels being pixels in which said mathematical end point corrected for said thickness falls, said group of shaded pixels having four corners;

means for choosing a sample origin at a corner of said shaded pixels;

means for assigning a full normalized intensity value to any shaded pixel that said mathematical end point corrected for said thickness completely covers; and means for assigning normalized intensity values to said shaded pixels that said mathematical end point corrected for said thickness does not completely cover based on the area of said mathematical end point corrected for said thickness lying within each shaded pixel.

7. The apparatus of claim 6, wherein said corner of said square is a bottom left corner of said square and said sample origin is a bottom left corner of said group of shaded pixels.

8. The apparatus of claim 6, wherein each of said pixels has assigned length of 1.0 and wherein said means for assigning a full normalized intensity value includes means for assigning a normalized intensity value of 1.0 to any pixel that said mathematical end point corrected for said thickness completely covers.

9. The apparatus of claim 8, wherein said means for assigning normalized intensity values includes:

means for determining horizontal and vertical distances (xfrac and yfrac) between said sample origin and said corner of said shaded pixels closest to said sample origin;

means for assigning a normalized intensity value of (1.0−xfrac)*(1.0−yfrac) for said shaded pixel which abuts said sample origin;

means for assigning a normalized intensity value of xfrac*yfrac for said shaded pixel opposite said shaded pixel which abuts said sample origin;

means for assigning a normalized intensity value of xfrac*(1.0−yfrac) for said shaded pixel which is at a same vertical level as said shaded pixel which abuts said sample origin but a different horizontal level; and means for assigning a normalized intensity value of (1.0−xfrac)*yfrac for said shaded pixel which is at a same horizontal level as said shaded pixel which abuts said sample origin but a different vertical level.

10. The apparatus of claim 6, wherein said normalized intensity values for said shaded pixels are further corrected for an intensity value of said line segment.

11. An apparatus for plotting a starting cap of a line segment on a computer display, said computer display comprising a plurality of pixels in a rectilinear array with an x-axis, wherein said x-axis in a positive x-direction has a direction of 0 degrees, said line segment having a mathematical origin, a direction, and a thickness, the apparatus comprising:

means for determining a mathematical origin corrected for said thickness by computing a square having said mathematical origin at one corner of said square, said square being aligned horizontally and vertically with said rectilinear array of pixels and each side of said square having a length equal to said thickness;

means for determining a group of shaded pixels, said shaded pixels being pixels in which said mathematical origin corrected for said thickness falls, said group of shaded pixels having four corners;

means for choosing a sample origin at a corner of said shaded pixels;

means for assigning a full normalized intensity value to any shaded pixel that said mathematical origin corrected for said thickness completely covers; and means for assigning normalized intensity values to said shaded pixels that said mathematical origin corrected for said thickness does not completely cover based on the area of said mathematical origin corrected for said thickness lying within each shaded pixel, said normalized intensity values being zero for any shaded pixels on aside of said group of shaded pixels in the same direction as said direction of said line segment if said direction is between −45 degrees and 135 degrees, said normalized intensity values being zero for any shaded pixels on a side of said group of shaded pixels in the opposite direction as said direction of said line segment if said direction of said line segment is between 135 degrees and 180 degrees or between −45 degrees and −180 degrees.

12. The apparatus of claim 11, wherein said corner of said square is a bottom left corner of said square and said sample origin is a bottom left corner of said group of shaded pixels.

13. The apparatus of claim 11, wherein each of said pixels has assigned length of 1.0 and wherein said means for assigning a full normalized intensity value includes means for assigning a normalized intensity value of 1.0 to any pixel that said mathematical origin corrected for said thickness completely covers.

14. The apparatus of claim 13, wherein said means for assigning normalized intensity values includes:
   means for determining horizontal and vertical distances (xfrac and yfrac) between said sample origin and said corner of said shaded pixels closest to said sample origin;
   means for assigning a normalized intensity value of (1.0−xfrac)*(1.0−yfrac) for said shaded pixel which abuts said sample origin and (1.0−xfrac)*yfrac for said shaded pixel which is at a same horizontal level as said shaded pixel which abuts said sample origin but a different vertical level if said direction of said line segment is between −45 degrees and 45 degrees;
   means for assigning a normalized intensity value of (1.0−xfrac)*(1.0−yfrac) for said shaded pixel which abuts said sample origin and xfrac*(1.0−yfrac) for said shaded pixel which is at a same vertical level as said shaded pixel which abuts said sample origin but a different horizontal level if said direction of said line segment is between 45 degrees and 135 degrees;
   means for assigning a normalized intensity value of xfrac*(1.0−yfrac) for said shaded pixel which is at a same vertical level as said shaded pixel which abuts said sample origin but a different horizontal level and xfrac*yfrac for said shaded pixel opposite said shaded pixel which abuts said sample origin if said direction of said line segment is between 135 degrees and 180 degrees or between −135 degrees and −180 degrees; and
   means for assigning a normalized intensity value of (1.0−xfrac)*yfrac for said shaded pixel which is at a same horizontal level as said shaded pixel which abuts said sample origin but a different vertical level and xfrac*(1.0−yfrac) for said shaded pixel which is at a same vertical level as said shaded pixel which abuts said sample origin but a different horizontal level if said direction of said line segment is between −45 degrees and −135 degrees.

15. The apparatus of claim 11, wherein said normalized intensity values for said shaded pixels are further corrected for an intensity value of said line segment.

16. An apparatus for plotting an ending cap of a line segment on a computer display, said computer display comprising a plurality of pixels in a rectilinear array with an x-axis, wherein said x-axis in a positive x-direction has a direction of 0 degrees, said line segment having a mathematical end point, a direction, and a thickness, the apparatus comprising:
   means for determining a mathematical end point corrected for said thickness by computing a square having said mathematical end point at one corner of said square, said square being aligned horizontally and vertically with said rectilinear array of pixels and each side of said square having a length equal to said thickness;
   means for determining a group of shaded pixels, said shaded pixels being pixels in which said mathematical end point corrected for said thickness falls, said group of shaded pixels having four corners;
   means for choosing a sample origin at a corner of said shaded pixels;
   means for assigning a full normalized intensity value to any shaded pixel that said mathematical end point corrected for said thickness completely covers; and
   means for assigning normalized intensity values to said shaded pixels that said mathematical end point corrected for said thickness does not completely cover based on the area of said mathematical end point corrected for said thickness lying within each shaded pixel, said normalized intensity values being zero for any shaded pixels on a side of said group of shaded pixels in the opposite direction as said direction of said line segment if said direction is between −45 degrees and 135 degrees, said normalized intensity values being zero for any shaded pixels on aside of said group of shaded pixels in the same direction as said direction of said line segment if said direction of said line segment is between 135 degrees and 180 degrees or between −45 degrees and −180 degrees.

17. The apparatus of claim 16, wherein said corner of said square is a bottom left corner of said square and said sample origin is a bottom left corner of said group of shaded pixels.

18. The apparatus of claim 16, wherein each of said pixels has assigned length of 1.0 and wherein said means for assigning a full normalized intensity value includes means for assigning a normalized intensity value of 1.0 to any pixel that said mathematical end point corrected for said thickness completely covers.

19. The apparatus of claim 18, wherein said means for assigning normalized intensity values includes:
   means for determining horizontal and vertical distances (xfrac and yfrac) between said sample origin and said corner of said shaded pixels closest to said sample origin;
   means for assigning a normalized intensity value of xfrac*(1.0−yfrac) for said shaded pixel which is at a same vertical level as said shaded pixel which abuts said sample origin but a different horizontal level and xfrac*yfrac for said shaded pixel opposite said shaded pixel which abuts said sample origin if said direction of said line segment is between −45 degrees and 45 degrees;
   means for assigning a normalized intensity value of (1.0−xfrac)*yfrac for said shaded pixel which is at a same horizontal level as said shaded pixel which abuts said sample origin but a different vertical level and xfrac*yfrac for said shaded pixel opposite said shaded pixel which abuts said sample origin if said direction of said line segment is between 45 degrees and 135 degrees;
   means for assigning a normalized intensity value of (1.0−xfrac)*(1.0−yfrac) for said shaded pixel which abuts said sample origin and (1.0−xfrac)*yfrac for said shaded pixel which is at a same horizontal level as said shaded pixel which abuts said sample origin but a different vertical level if said direction of said line segment is between 135 degrees and 180 degrees or between −135 degrees and −180 degrees; and
   means for assigning a normalized intensity value of (1.0−xfrac)*(1.0−yfrac) for said shaded pixel which abuts said sample origin and xfrac*(1.0−yfrac) for said shaded pixel which is at a same vertical level as said shaded pixel which abuts said sample origin but a different horizontal level if said direction of said line segment is between −45 degrees and −135 degrees.

20. The apparatus of claim 16, wherein said normalized intensity values for said shaded pixels are further corrected for an intensity value of said line segment.

* * * * *

UNITED STATES PATENT AND TRADEMARK OFFICE
CERTIFICATE OF CORRECTION

PATENT NO. : 6,636,231 B1
DATED : October 21, 2003
INVENTOR(S) : Gunawan Ali-Santosa It is certified that error appears in the above-identified patent and that said Letters Patent is hereby corrected as shown below:

Title page,
Item [30], Related U.S. Application Data, "continuation of co-pending U.S. Patent Application Serial No. 09/544,658, filed on April 6, 2000, now U.S. Patent 6,636,230, issued October 21, 2003."

Signed and Sealed this

Fifth Day of October, 2004

JON W. DUDAS
*Director of the United States Patent and Trademark Office*